Aug. 12, 1958     G. A. LYON     2,847,251
WHEEL COVER
Filed March 4, 1953
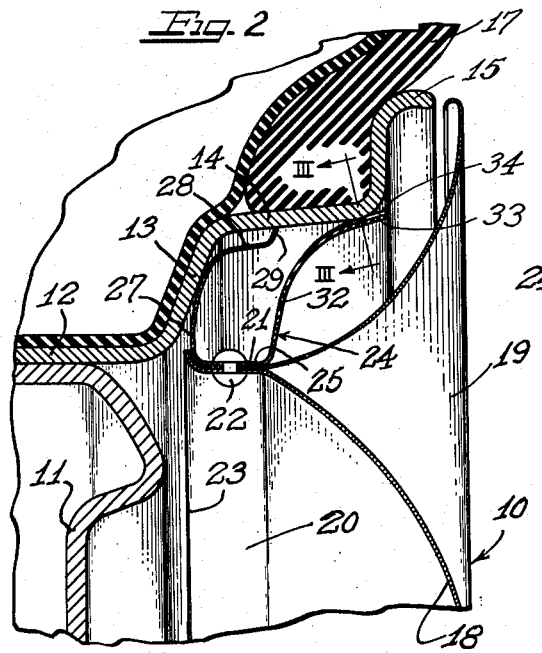
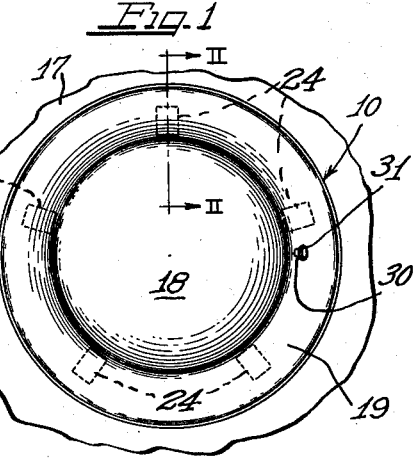
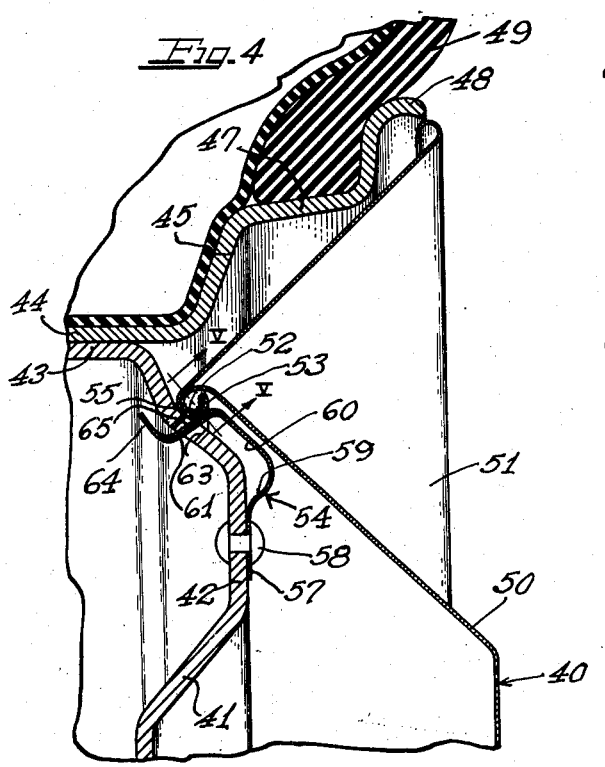
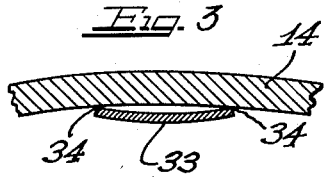
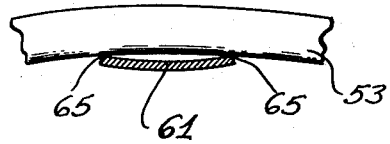
Inventor
GEORGE ALBERT LYON

United States Patent Office 2,847,251
Patented Aug. 12, 1958

2,847,251

WHEEL COVER

George Albert Lyon, Detroit, Mich.

Application March 4, 1953, Serial No. 340,181

9 Claims. (Cl. 301—37)

The present invention relates to improvements in wheel structures and more particularly concerns the ornamental and protective covering of the outer sides of vehicle wheels.

An important object of the present invention is to provide an improved wheel structure having thereon a cover which is held both in preferred axial disposition relative to the wheel and against turning on the wheel.

Another object of the invention is to provide a vehicle wheel structure and a cover therefor wherein clips are provided that have edges thereon interengageable with a surface in a manner to hold the cover against turning on the wheel.

A further object of the invention is to provide a vehicle wheel cover and retaining spring clip arrangement for holding the cover on a wheel in predetermined axial disposition relative to the wheel and also against turning on the wheel.

Still another object of the invention is to provide a wheel cover for disposition at the outer side of the vehicle wheel and having means thereon for retaining the same on a wheel in press-on, pry-off relation and equipped with means engageable with the wheel to hold the cover against turning.

Yet another object of the invention is to provide a retaining spring clip for wheel covers provided with edges that will engage with a surface to resist turning of a cover with which associated.

Other objects, features and advantages of the present invention will be readily apparent from the following detailed description of certain preferred embodiments thereof taken in conjunction with the accompanying drawings in which:

Figure 1 is a side elevational view of a wheel structure embodying features of the invention;

Figure 2 is an enlarged, fragmentary radial sectional view taken substantially on the line II—II of Figure 1;

Figure 3 is an enlarged fragmentary sectional detail view taken substantially on the line III—III of Figure 2;

Figure 4 is a fragmentary radial sectional view through a modification; and

Figure 5 is a fragmentary enlarged sectional view taken substantially on the line V—V of Figure 4.

According to the present invention, a cover 10 is adapted to be applied to the outer side of a vehicle wheel comprising a wheel body 11 which may be of the disk-spider type and stamped from suitable heavy gauge sheet metal and secured to a base flange 12 of a drop center type multi flange tire rim. The tire rim has a side flange 13 extending from the base flange and merging with a generally radially and axially outwardly directed intermediate flange 14 joining a terminal flange 15. The tire rim is adapted to support a pneumatic tire and tube assembly 17.

In the present instance the cover 10 comprises a central or crown portion 18 and an outer annular portion 19. The portions 18 and 19 are preferably constructed separately and then assembled. By preference the crown portion 18 is of a diameter to substantially cover the wheel body 11, while the annular cover portion 19 is dimentioned to substantially overlie the outer side of the tire rim. The cover portions 18 and 19 are marginally related to provide a flange structure behind the cover for engagement by means through the medium of which the cover is adapted to be attached in snap-on, pry-off relation on the wheel. To this end, the outer margin of the inner cover member 18 is provided with an axially inwardly extending flange 20, and the outer cover member 19 is directed generally radially and axially inwardly and has an axially inwardly directed inner marginal flange portion 21. The flanges 20 and 21 are in telescoped, abutting relation and are secured together fixedly as by means of rivets 22 which may be provided in any preferred number such as from 3 to 5, more or less. This provides a multi-layer juncture for the cover members of substantial rigidity or stiffness and which may be additionally stiffened by the provision of a turned extremity 23, in the present instance directed generally radially outwardly.

For retaining the cover on the wheel, the juncture flange structure 20, 21 is provided with a plurality of retaining spring clips 24. Whereas the cover members 18 and 19 may be made from material that is of not especially high resiliency characteristics, the retaining spring clips 24 are made from a spring steel sheet metal stock. There may be any preferred number of the spring clips 24, but as indicated in Figure 1 five of the spring clips symmetrically spaced may be provided.

Each of the spring clips 24 preferably comprises a base flange 25 resting against the radially outer side of the juncture flange 21 of the outer cover member 19 and preferably secured thereto by means of the respective attachment rivets 22. Extending generally radially outwardly from the axially inner portion of the base flange 25 of the clip is a resilient clip leg 27 having an angularly generally axially outwardly and radially outwardly slanted engagement leg port 28 terminating in a fairly short and stiff generally radially outwardly directed engagement flange or tip 29 retainingly engageable in gripping radially outwardly tensioned relation with the intermediate flange 14 of the tire rim. Juncture of the retaining leg 27 of the clips with the base flange 25 is preferably cradled in the reentrant seat provided by the juncture flange terminal 23.

As will be observed in Figure 2, the juncture flange assembly 20, 21 is of a diameter substantially smaller than the inner diameter of the intermediate flange 14 of the tire rim so as to afford a substantial space within which the retaining clips 24 are operable. The initial diameter to which the spring clip terminals 29 extend is somewhat greater than the inside diameter of the intermediate flange 14. Hence, in applying the cover to the outer side of the wheel, the retaining clip terminals 29 are pressed inwardly along the intermediate flange 14 which causes the clips to be placed under radially inward compression as the result of camming of the terminals 29 along the sloping inner surface of the intermediate flange and as the terminals 29 reach final engaging relation to the terminal flange and their inner margin, the clip legs 27 are under substantial resilient tension reacting to thrust the terminals 29 into firm gripping relation to the intermediate flange 14.

Since, in the rotation of the wheel under service conditions, substantial torque is imparted to the cover 10, there may be a tendency of the cover to turn relative to the wheel and thus disturb the relationship of the cover to the valve stem 30 projecting through a valve stem opening 31 in the outer cover member 19. Means are therefore provided to restrain the cover against turning relative to the wheel. Herein such means comprise secondary spring legs 32 on the clips 24. The legs 32 extend from the axially outer ends of the clip base flanges 25 generally radially outwardly and have generally radially outwardly and axially outwardly directed terminal flange portions 33 arranged to bear under substantial resilient tension against the tire rim, preferably adjacent to juncture of the intermediate flange 14 with the terminal flange 15 of the tire rim. Initially, the secondary legs 32 of the clips are biased generally axially inwardly so that as the cover is mounted on the wheel by axially inward pressure thereagainst to drive the retaining legs 27 of the clips into their retaining engagement with the intermediate flange 14, the secondary legs 32 at their terminal flanges 33 are pressed under substantial resilient tension to thrust against the tire rim.

While the resilient tension thrust of the secondary clip legs 32 against the tire rim assists the resilient retaining clip legs 27 in holding the cover in cushioned substantially centered relation on the wheel, means are provided on the secondary leg terminal portions 33 to grip the tire rim and resist turning of the wheel. To this end, the clip leg terminals 33 are transversely bowed or arched to present sharp side edges 34 into gripping engagement with the opposing concavely arched tire rim surface. Even though the turn-resisting edges 34 may not dig very hard against the tire rim, there are enough irregularities usually present in the surface of the tire rim not only in the material of the tire rim itself, but in the paint usually applied thereto to enable the edges 34 to attain sufficient grip for the intended function. It will thus be apparent that each of the retaining clip terminals 33 resists turning of the wheel in each opposite rotary direction.

In the modification of Figures 4 and 5, a wheel cover 40 is arranged for disposition at the outer side of a vehicle wheel comprising a disk spider wheel body 41 having an intermediate annular nose bulge 42 and an outer marginal generally axially inwardly extending attachment flange 43 by which the wheel body is secured to a base flange 44 of a tire rim. The tire rim is of the drop-center multi-flange type having an outer side flange 45 extending from the base flange 44 and joining an intermediate flange 47 which merges with a terminal flange 48. A pneumatic tire and tube assembly 49 is adapted to be supported by the tire rim.

The cover 40 comprises a central circular crown portion 50 which is of a diameter to substantially cover the outer side of the wheel body 41, and an annular outer cover member 51 which is of a diameter to substantially cover the outer side of the tire rim. The cover members 50 and 51 are marginally assembled into a substantially rigid cover structure. To this end the inner cover member 50 slopes generally radially outwardly and axially inwardly and has a marginal axially inwardly directed and under curled bead-like marginal flange 52 which is interlocked within a complementary bead-like inner marginal flange 53 of the outer cover member 51 which slopes generally radially and axially inwardly to juncture with the outer margin of the inner cover member. The internested, interlocked inwardly curled flanges 52 and 53 provide a rigid juncture flange concealed behind the cover assembly. The diameter of the combined bead-like reinforcing flange 52, 53 is such as to seat in assembly within an indented annular groove 55 in the wheel body 41 at the radially outer side of the nose bulge 42.

For retaining the cover 40 on the wheel, spring clips 54 are mounted on the wheel body 41 for retaining engagement with the underturned bead-like flange 53 of the cover. To this end, the retaining clips 54 are provided with attachment bases 57 adapted to be secured by means of respective rivets 58 to the axially outer side of the nose bulge 42 which for this purpose may be substantially flattened in structure to provide a clip base plateau.

The retaining clips 54 are provided with respective retaining loop-like resilient flange structures including a generally axially and radially outwardly directed juncture flange 59 at the radially outer side of the clip base flange 57 for supporting a resilient cam head flange 60 in spaced relation to the wheel body and sloping generally radially outwardly and axially inwardly to a generally axially inwardly and radially inwardly directed retaining shoulder flange 61 which extends through a clearance aperture 63 in the wheel body and terminates in generally radially outwardly and axially inwardly slanting angular stop flange 64 engageable in the unstressed condition of the clip against the axially inner side of the wheel body at the radially outer margin of the aperture 63. The clips 54, which may be in any preferred number such as from 3 to 5, symmetrically spaced on the wheel body, are disposed to have the retaining shoulder flanges 61 thereof on a diameter normally slightly greater than the inside diameter defined by the cover flange 53. Hence, in applying the cover 40 to the wheel, the flange 53 is engaged against the cam flange 60 of the respective clips 54 and upon inward pressure the clips are resiliently cammed radially inwardly until the flange 53 of the cover snaps behind the shoulder flange 61 of the clips. The clips thus resiliently shoulder against the radially inwardly and axially outwardly facing shoulder provided by the flange 53 and thrust the curled flange 53 firmly into the groove 55 of the wheel body.

In order to hold the cover 40 against turning, the clips 54 are provided with means interengageable with the cover. To this end, the retaining shoulder flanges 61 of the clips are preferably formed to provide laterally directed respective edges 65 engageable in turn-preventing relation with the cover flange 53, as best seen in Figure 5. This is accomplished herein by forming the retaining shoulder flanges 61 of transversely arched or bowed structure so that the side edges of the clip flange 61 will be directed generally radially outwardly for effective turn-preventing and biting engagement with the oppositely, concavely bowed or arched curled, bead-like flange 53 of the cover. The inherent resiliency of the clips thrusting radially outwardly and axially inwardly against the flange 53 of the cover assures that as an incident to the retaining engagement of the clips 54 the turn-preventing edges 65 will have functionally adequate engagement with the cover flange 53.

It will thus be observed, that in both forms of the cover 10 and 40, the cover is applied to the wheel by a generally axially inward pressure thereagainst to press or snap the cover home into position on the wheel so that the retaining spring clips are, in each instance, placed under substantial resilient tensioning, thrusting engagement with the surfaces which they retainingly oppose in service. The resilient tension to which the clips are subjected causes the peripherally oppositely directed turn-preventing edges of the clips to maintain secure resistance to torque imposed twisting or turning of the respective covers on the wheel. Moreover, in view of the fact that the portions of the resilient clips that have the turn-preventing edges thereon are of substantial length, at least a limited amount of lateral resilient deflection peripherally of the cover is permitted to absorb shocks resulting from sudden or jerky oscillatory or stopping and starting movements in the rotation of the wheel. This feature tends to prevent slippage of the turn-preventing biting, gripping edges of the clips on the surfaces against which they thrust in service.

It will be understood that modifications and variations may be effected without departing from the scope of the novel concepts of the present invention.

I claim as my invention:

1. In a wheel structure including a body portion and a multi-flange tire rim, a cover for disposition at the outer side of the wheel and having a generally axially inwardly extending intermediate flange structure, said flange structure carrying a series of retaining spring clips having portions thereof retainingly engageable in press-on pry-off relation with respect to the tire rim, said clips having additional portions thereon arranged to bear under resilient tension against a portion of the tire rim and having edges engageable in gripping relation with the tire rim to hold the cover against turning on the wheel.

2. In a wheel structure including a wheel body and a tire rim, a cover for disposition on the outer side of the wheel having an intermediate inwardly directed flange structure, a series of retaining clips carried by the wheel body and retainingly engageable with said flange structure, said clips having edges thereon bitingly engageable with said flange structure to hold the cover against turning on the wheel, said flange structure comprising a bead-like formation and the wheel body having an annular groove within which said bead-like formation is retainingly seated when in engagement with said retaining clips.

3. In a clip for use in retaining a cover on a wheel, a base portion having a retaining resilient leg extending from one end thereof, and a secondary leg extending from the opposite end thereof, said secondary leg having a side edge thereof providing a biting engagement means for an opposing surface.

4. In a wheel structure including a circular member, a cover member for disposition over the outer side of said circular member, one of said members having a circular portion of rounded form transversely across its perimeter, the other of said members having secured thereto a resilient element provided with a resiliently flexible arm portion disposed to extend transversely across said circular transversely rounded portion and to bear thereagainst under resilient tension, said arm having a biting edge turned obliquely toward said circular transversely rounded portion for bitingly gripping the same to hold the cover against turning relative to the wheel.

5. In a cover for disposition at the outer side of a vehicle wheel rim that has a generally axially extending and radially inwardly facing annular flange, a circular cover member for overlying the rim and having spaced inwardly from its radially outer extremity a generally axially inwardly extending circular portion dimensioned for substantially telescoping spaced disposition within the rim flange, and a turn preventing element carried by and projecting resiliently generally radially and axially outwardly from said cover portion, said element having a distal end portion of substantial width providing a generally radially outwardly directed face for thrusting toward said rim flange and having a longitudinal biting edge directed generally obliquely radially and circumferentially for biting into the rim flange under the resilient thrust of said distal end portion and for thereby holding the cover against turning on the wheel.

6. In a cover for disposition at the outer side of a vehicle vehicle having an annular generally radially facing portion, a cover member having thereon a circumferential series of longitudinally generally axially extending resiliently flexible finger elements of substantial circumferential width, said fingers having tip portions spaced axially a substantial distance beyond the connections of the fingers to the cover and having portions adjacent to said tips adapted for facewise opposition to said annular wheel portion and normally projecting radially to a diameter which will result in resiliently flexible facewise thrust of said finger portions toward said annular cover portion upon telescoping of the series of fingers therewith, said fingers having longitudinal side edges angular to said tips turned generally in the direction of facing of the wheel portion opposing faces of the fingers and engageable bitingly with the wheel portion for holding the cover against turning relative to the wheel.

7. In a wheel structure including a generally radially facing circular portion, a cover for disposition over the outer side of the wheel including a circular cover portion for overlying the wheel portion and having a generally axially inwardly extending circular portion dimensioned for substantially telescoping disposition relative to said wheel portion, and a turn-preventing element carried by and projecting resiliently generally radially and axially from one of said portions, said element having a distal end portion of substantial width providing a generally radially outwardly directed face for thrusting toward the other of said portions and having a longitudinal biting edge directed generally obliquely radially and circumferentially for biting into said other portion under the resilient thrust of said distal end portion and for thereby holding the cover against turning on the wheel.

8. A wheel structure as defined in claim 7 wherein said one portion comprises said circular portion of the cover member and said resilient turn-preventing element comprises a resilient clip that is secured to said member portion and projects as a resilient finger therefrom.

9. A wheel structure as defined in claim 7 wherein said resilient turn-preventing element comprises a clip that is secured to said one portion which comprises the wheel portion while the circular portion of the cover member comprises a relatively stiff turned bead engaged by said biting edge.

References Cited in the file of this patent

UNITED STATES PATENTS

| | | |
|---|---|---|
| 1,953,634 | Reichenbach | Apr. 3, 1934 |
| 2,306,630 | Lyon | Dec. 29, 1942 |
| 2,368,235 | Lyon | Jan. 30, 1945 |
| 2,405,587 | Lyon | Aug. 13, 1946 |
| 2,444,053 | Lyon | June 29, 1948 |
| 2,624,636 | Lyon | Jan. 6, 1953 |
| 2,625,439 | Horn | Jan. 13, 1953 |